March 29, 1966  K. S. SHOEMAKER  3,243,156
BACK PRESSURE VALVE
Filed Sept. 6, 1963
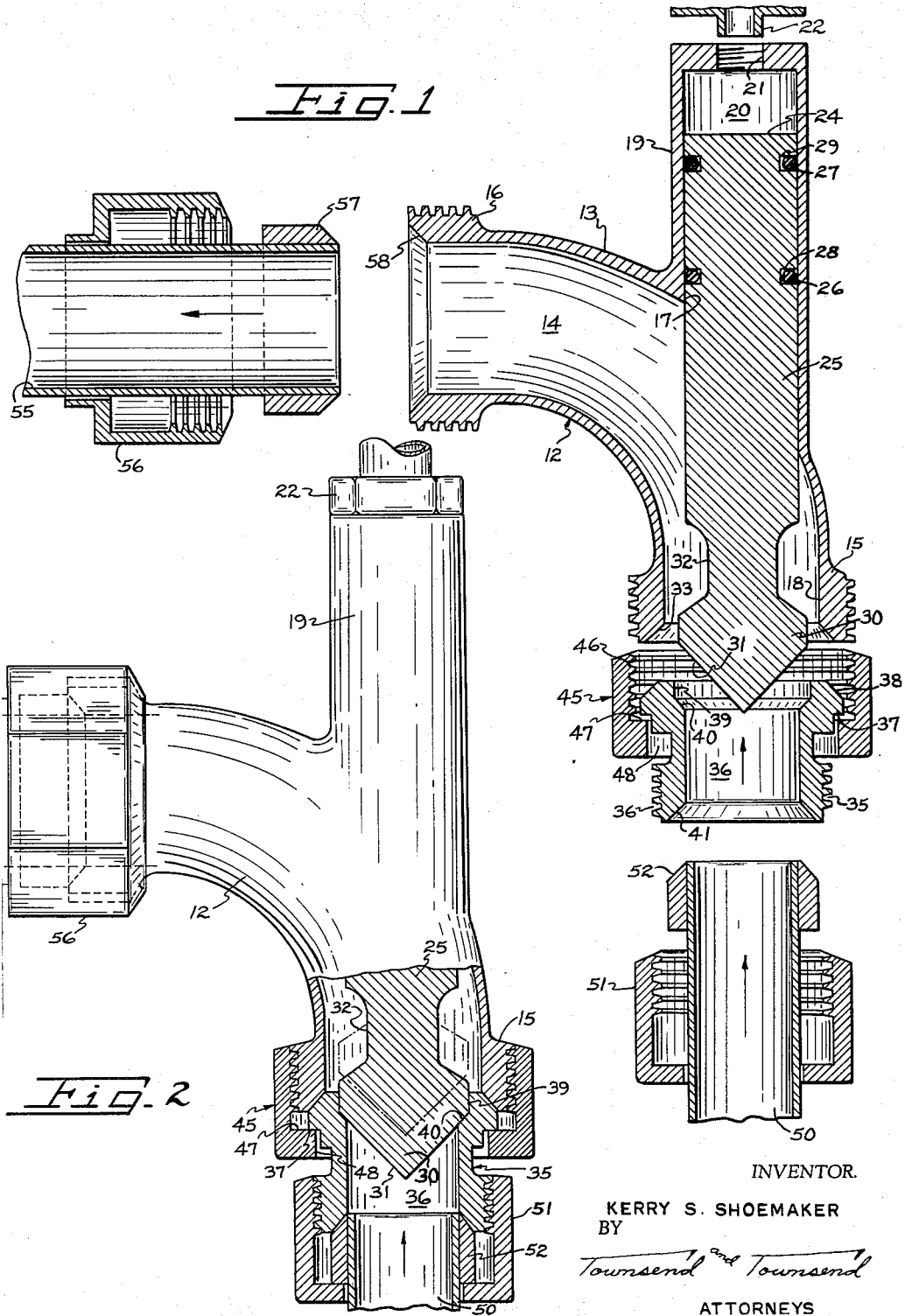
INVENTOR.
KERRY S. SHOEMAKER
BY
Townsend and Townsend
ATTORNEYS 3,243,156
BACK PRESSURE VALVE
Kerry S. Shoemaker, Fremont, Mich., assignor to Gerber
Products Company, Fremont, Mich.
Filed Sept. 6, 1963, Ser. No. 307,050
1 Claim. (Cl. 251—63)

This invention relates to a pneumatic valve in which pressurized fluid operates to open and close the valve passageway.

In food handling conduits, health requirements for cleanliness are such that frequent cleaning and flushing of the system is required in order to eliminate old food particles which could eventually pollute and contaminate subsequent mixtures. In this respect, the fluid flow control valves of the system have to be disconnected from the lines and dismantled for cleaning. Since these valves usually include a plurality of interrelated parts of complex shapes, which form food trapping surfaces, the cleaning job can be time consuming and difficult.

Accordingly, it is an object of this invention to overcome the above problem by providing a simple valve structure which can be easily dismantled and disassembled for cleaning and repair.

A related object is to provide a simple valve structure which can be secured to a conventional pipe elbow and operated to seal and open the elbow passageway under the influence of dynamic fluid pressure. An advantage of using a conventional pipe elbow is that the machining costs normally associated with conventional valve housings is eliminated or substantially reduced.

Still another object of this invention is to provide a pressure operated valve of the above type in which the valve seat is removably connected to one end of the elbow in coaxial alignment with a reciprocal valve stem or needle whereby removal of the valve seat fitting creates a large passageway which permits easy removal of the valve stem. Accordingly, the outside diameter of the valve stem is substantially less than the inside diameter of the elbow passageway in which it reciprocally slides.

Yet another object of this invention is to provide a simple valve of the above type having few parts and in which a control pressure is directed against one end of the valve stem and the food slurry exerts an opposing pressure on the other end whereby the differential pressure between control pressure and the input fluid flow pressure causes the valve stem to move reciprocally along one axis of the pipe elbow for selectively opening and sealing the pipe passageway. An advantage of this valve resides in the fact that good control can be simply maintained over the fluid flow within wide operating ranges.

Still another object of this invention is to provide a valve of the above type in which the valve face and seat are of such a configuration that a substantial input opening is provided when the valve stem is moved out of the seat and wherein the shape and angle of the valve surfaces and seat surfaces are not critical in order to prevent fluid turbulence, and in which the beveled valve stem face aids in guiding the stem into the seat.

Still another object is to provide a differential pressure operated valve of the above type in which the effective cross-sectional areas of the valve face and the control pressure end of the valve are equal so that the food slurry flow can be controlled by a one-to-one control pressure ratio. A feature and advantage of this is that the control pressure can be set directly at the desired food slurry flow pressure.

Other objects, features and advantages of this invention will become apparent upon reading the following detailed description of one embodiment of this invention and referring to the accompanying drawings in which:

FIGURE 1 is a cross-sectional side elevational view of the valve in which the inlet and outlet pipes and the valve seat are dismantled from the main portion; and FIGURE 2 is the side elevational view of the valve of FIGURE 1 fully assembled and in which the valve face and seat portion is shown in cross-section.

Now referring to the drawings, there is illustrated a standard 90° elbow 12 in which the thin wall 13 forms a curved substantially circular passageway 14 through which a food slurry flows. In order to provide a connection means for hooking this elbow into fluid circuit with inlet and outlet pipes, relatively thick cylindrical lands 15 and 16 are formed at each end of the elbow. An external thread is then formed along each of these lands for receiving threaded pipe fittings as will be explained.

By forming an aperture 17 in the curved back wall of elbow 12 it is possible to provide a path for a reciprocally moving valve stem 25. Ideally, aperture 17 should be coaxially aligned with one axis of the elbow and centered with elbow inlet 18. A control cylinder or chamber 19 is then secured to the back wall of elbow 12 to surround stem aperture 17. It should be understood that the rim of control chamber 19 is contoured to be attached to elbow 12 by welding or any other equivalent conventional leak proof fastening method. Ideally, control chamber 19 is formed with a cylindrical inner chamber 20 which is coaxially aligned with the center of aperture 17 and along one axis of elbow 13. The end wall of control chamber 19 has an internally threaded inlet orifice 21 formed therein. By threading the fitting 22 into orifice 21, control fluid such as air can be supplied to chamber 20. By thus supplying pressurized gas or air, the axial displacement of a valve stem 25 can be controlled, as will be explained shortly.

Now that the basic valve housing structure has been described, the valve stem 25 and its function and operation can be described in detail. This valve stem 25 is substantially rod-like in shape and the same cross-sectional shape as control chamber 20. By proper choice of tolerances or clearance between valve stem 25 and the walls of chamber 20, the valve stem can be slidably mounted for free reciprocal sliding motion without any substantial attendant axial wobble. Since the clearance cannot, however, be made so close that there will be no fluid leakage along this interface without causing binding, a pair of O-rings 26 and 27 are inserted within two spaced apart angular grooves 28 and 29, respectively. These O-rings are made of rubber, plastic or the like, to provide a packing or seal which prevents: pressurized control fluid from flowing from control chamber 20 into the food slurry; or pressurized food slurry from traveling or leaking into control chamber 20.

A piston head 30 is formed at the free end of valve stem 25 to control food slurry flow. The forward face 31 of this piston head can be generally conical in shape. Just beyond piston head 30, the valve body is necked-down along a short axial length at 32 thereby forming a path for substantially non-turbulent fluid flow when the valve is opened.

A valve seat 35 is coaxially aligned with stem 25 and connected to the mouth of elbow 12. Valve seat body 35 is in the form of a reducer section having the passageway or bore 36 formed through its center. In order to connect the reducer 35 to the inlet mouth of elbow 12, a ferrule 45 having internal threads 46 formed along one portion of its cylindrical passageway and a shoulder 47 formed at one end is placed around seat body 35. Reducer 35, in turn, has a shoulder 37 formed in the central portion thereof which engages the ferrule shoulder 47. The forward edge of reducer 35 is beveled at 38 so that when ferrule 45 is threaded onto elbow flange 15, the mating beveled portion 33 at the mouth of elbow 12 forms a fluid tight seal while at the same time settling the reducer section 35 into coaxial alignment with the axis of the inlet portion of elbow 12.

The reducer section passageway 36 has an enlarged diameter valve seat formed at one end for receiving piston head 30 and valve face 31. The cylindrical portion 39 of this seat has an inside diameter slightly greater than the outside diameter of piston 30, and the beveled seat portion 40 is formed at the same angle as the conical valve face 31. This arrangement provides a valve seat in which the substantial sealing area greatly retards leakage.

In order to control the effective pressure differential on sliding valve stem 25, the cross-sectional area of valve face 24 can be equal to the cross-sectional area of valve seat bore 36. Thus, when the pressure of the food slurry exceeds the control pressure in control chamber 20, the valve will unseat or open.

An inlet pipe 50 is connected to the reducer section by means of ferrule 51 which engages the threaded portion 36 of the reducer. A beveled sealing flange 52 is secured to the end of inlet pipe 50 and is drawn into intimate contact with the reducer forward beveled portion 41 to form a fluid-tight seal thereby providing a path for food slurry flow in the direction of the arrow. It should, of course, be understood that this ferrule connection is only meant to be representative and that any other established sanitary connector can be used in its place.

Similarly, an outlet pipe 55 is connected to the elbow flange 16 by ferrule 56 which draws the beveled seal 57 into intimate contact with the beveled portion 58 of the elbow outlet mouth. This thus provides a continuous path for fluid flow in which fluid flow can be obstructed when valve stem 25 is seated.

As is conventional with food handling equipment, the pipe, elbow, valve stem and seat body can be made from stainless steel.

Now, in explaining the operation of the valve, it should be first understood that axial displacement of valve stem 25 is dependent upon the differential pressure resulting from the fluid pressure in control chamber 20 and the opposing hydraulic pressure exerted on the valve face 31 by the food slurry. When the axially directed force exerted on the rear face 24 of valve stem 25 is greater than the axially directed forces exerted on the piston face 31 by the food slurry, the valve will tend to seat and seal the passageway against fluid flow. When, however, the force exerted on valve face 31 by the inlet fluid flow exceeds the force exerted on the rear piston face 24 by the control fluid, the valve will tend to unseat and open the passageway to fluid flow as illustrated by the dotted piston head 30 of FIGURE 2. Thus, it can be seen that the higher the inlet fluid pressure or the lower the relative control fluid pressure the greater will be food flow through the elbow. Since the effective cross-sectional area of conical piston face 31 can be equal to the cross-sectional area of valve stem face 24, the valve can open when the pressure of the food slurry exceeds the pressure of the control fluid in control chamber 20.

When the valve is open as shown by the dotted line in FIGURE 2, fluid flow occurs through inlet pipe 50, valve seat passageway 36, around the valve face 31 and through the annular passageway formed between piston head 30 and wall 18 of the elbow. Once the fluid has passed through this annular passageway a portion of it tends to flow downward through the necked-down portion 32 of the valve stem thereby providing substantially increased fluid flow. As a result of this configuration of valve and valve seat, substantially non-turbulent fluid flow can occur. In addition, there are few food trapping corners and edges in the body portion of the valve thereby aiding the cleaning process and insuring pure food flow for longer periods of time.

When it is necessary to dismantle the valve all that one has to do is disconnect the inlet pipe 50 and valve seat 35 by unscrewing ferrule 45. Once the reducer section is removed, an opening is provided at elbow mouth for removal of the valve stem 25 along the elbow axis. Since there is a clearance between the inner wall of elbow 12 and the outer wall of the piston head 30 it is easy to grip the valve stem 25 and pull it from the control chamber for complete dismantling of the assembly. Thereafter, only two O-rings have to be replaced if they are worn and stem 25 replaced or reinserted.

Although one embodiment of this invention has been illustrated and described, it should be understood that other changes can be made in the shapes, arrangement of parts, sizes and dimensions without departing from the scope of the invention as defined in the appended claim.

What is claimed is:

A pneumatic pressure regulated valve comprising, in combination: an elbow housing member having inlet and outlet means and defining a curved passageway extending therebetween, means defining a control cylinder connected to said elbow housing in axial alignment with the axis of said inlet means and with one end in communication with said passageway, means joined to said control cylinder for closing the opposite end thereof and for forming therewith a receptacle of one-piece construction, valve seat means, quick release means removably securing said valve seat means to said housing in axial alignment with the axis of said inlet means, said valve seat means having a substantially cylindrical input fluid passageway communicating with said curved passageway and a valve seat surrounding said input fluid passageway, valve stem means shiftably mounted within and substantially complemental to said control cylinder for reciprocal movement along an axis in alignment with the axis of said inlet means and including a valve face shaped for sealing engagement with the valve seat of said valve seat means, said inlet means and the portion of said curved passageway between said inlet means and said one end of said control cylinder being of a size and configuration to permit movement of said valve stem means therethrough and thereby into and out of said control cylinder, whereby said inlet means provides the exit for said valve stem means when the latter is to be removed from the control cylinder and the elbow housing member and after the valve seat means has been removed from said housing, means providing a seal between the exterior surface of said valve stem and said control cylinder to seal from said curved passageway a pressure chamber defined within said control cylinder between the opposite end of said valve stem and said closing means of said control cylinder, and a control fluid conduit in fluid communication with the pressure chamber and extending through said closing means to permit pressurizing of said chamber to a predetermined pressure whereby said valve stem means will be shifted to seat said valve face against said valve seat when the pressure in said pressure chamber exceeds the pressure exerted by fluid in said input fluid passageway to thereby close said inlet means, said valve stem means being movable away from said valve seat means when fluid pressure in said input passageway exceeds the pressure in said pressure chamber to open said inlet means.

References Cited by the Examiner

UNITED STATES PATENTS

| 417,329 | 12/1889 | Marsh. | |
| 1,769,838 | 7/1930 | Jackson | 251—43 X |
| 2,068,833 | 1/1937 | White et al. | 137—515.7 |

FOREIGN PATENTS

| 1,083,096 | 6/1960 | Germany. |
| 96 | of 1898 | Great Britain. |

M. CARY NELSON, *Primary Examiner.*

A. JAFFE, E. FEIN, *Assistant Examiners.*